(12) United States Patent
Decrop et al.

(10) Patent No.: US 11,977,853 B2
(45) Date of Patent: May 7, 2024

(54) AGGREGATING AND IDENTIFYING NEW SIGN LANGUAGE SIGNS

(71) Applicant: International Business Machines Corporation, Armonk, NY (US)

(72) Inventors: Clement Decrop, Arlington, VA (US); Charles E. Beller, Baltimore, MD (US); Zachary A. Silverstein, Georgetown, TX (US); Jeremy R. Fox, Georgetown, TX (US)

(73) Assignee: International Business Machines Corporation, Armonk, NY (US)

( * ) Notice: Subject to any disclaimer, the term of this patent is extended or adjusted under 35 U.S.C. 154(b) by 326 days.

(21) Appl. No.: 17/486,848

(22) Filed: Sep. 27, 2021

(65) Prior Publication Data

US 2023/0095895 A1    Mar. 30, 2023

(51) Int. Cl.
*G06V 40/20* (2022.01)
*G06F 40/47* (2020.01)
*G06N 3/04* (2023.01)
*G06V 40/10* (2022.01)

(52) U.S. Cl.
CPC ............ *G06F 40/47* (2020.01); *G06N 3/04* (2013.01); *G06V 40/113* (2022.01); *G06V 40/28* (2022.01); *G06F 2218/12* (2023.01)

(58) Field of Classification Search
CPC ...... G06F 40/47; G06F 2218/12; G06F 18/22; G06N 3/04; G06N 3/09; G06V 40/113; G06V 40/28; G06V 20/40
See application file for complete search history.

(56) References Cited

U.S. PATENT DOCUMENTS

| | | | |
|---|---|---|---|
| 8,140,339 B2 | 3/2012 | Hernandez-Rebollar | |
| 8,411,824 B2 | 4/2013 | Bucchieri | |
| 2004/0012643 A1* | 1/2004 | August | G09B 21/009 715/865 |
| 2010/0063794 A1 | 3/2010 | Hernandez-Rebollar | |
| 2016/0014297 A1 | 1/2016 | Aller | |
| 2016/0042228 A1* | 2/2016 | Opalka | G06F 3/01 382/103 |
| 2020/0193714 A1 | 6/2020 | Browy | |

OTHER PUBLICATIONS

Jose L. Hernandez-Rebollar; Gesture-Driven American Sign Language Phraselator; ICMI '05: Proceedings of the 7th international conference on Multimodal interfaces; Oct. 2005; pp. 288-292. (Year: 2005).*
"American Sign Language Dictionary," SignASL.org, accessed Sep. 27, 2021, 2 pages. <https://www.signasl.org/>.
"American Sign Language," LifePrint, accessed Sep. 26, 2021, 7 pages. <https://www.lifeprint.com/asl101/fingerspelling/fingerspelling.htm>.

(Continued)

*Primary Examiner* — Abul K Azad
(74) *Attorney, Agent, or Firm* — Jared C. Chaney (57) ABSTRACT

A system for receiving a corpus of sign language data in which a plurality of known signs each correspond to known meanings, generate a model for identifying new sign language signs using the corpus, and identifying, using the model, a new sign language sign that does not match any of the plurality of known signs.

17 Claims, 4 Drawing Sheets

(56) References Cited

OTHER PUBLICATIONS

"American Sign Language," Wikipedia, accessed Sep. 26, 2021, 18 pages. <https://en.wikipedia.org/wiki/American_Sign_Language>.
"ASLU," LifePrint, accessed Sep. 27, 2021, 5 pages. <http://www.lifeprint.com/>.
"Explore The English Language," Lexico, accessed Sep. 27, 2021, 3 pages. <https://www.lexico.com/explore>.
"Fingerspelling in American Sign Language," StartASL.com, Feb. 15, 2021, 3 pages. <https://www.startasl.com/fingerspelling/>.
"Machine translation of sign languages," Wikipedia, accessed Sep. 27, 2021, 6 pages. <https://en.wikipedia.org/wiki/Machine_translation_of_sign_languages>.
"Sign language online," HandSpeak.com, accessed Sep. 27, 2021, 7 pages. <https://www.handspeak.com/>.
Anonymous, "Novel System for Teaching Deaf Community Through Hand Sign to Pictograph Conversion," IP.com, Disclosure No. IPCOM000263906D, Oct. 19, 2020, 3 pages. <https://ip.com/IPCOM/000263906>.
Cartwright, "Signs That Are Close . . . But Not the Same—Iconic Signs," Signing Savvy, Jul. 21, 2021, 10 pages. <https://www.signingsavvy.com/>.
Fang et al., "DeepASL Enabling Ubiquitous and Non-Intrusive Word and Sentence-Level Sign Language Translation." Proceedings of 15th ACM Conference on Embedded Networked Sensor Systems (SenSys '17), Article 5, Nov. 6-8, 2017, 13 pages.
Fessenden, "This Is How New Words Enter the Vernacular of ASL," Smithsonian Magazine, Feb. 26, 2015, 6 pages. <https://www.smithsonianmag.com/smart-news/how-new-words-enter-vernacular-asl-180954419/>.
Fogarty, "Google Ngram and 'Impact' as a Verb," Quick and Dirty Tips, Nov. 1, 2012, 12 pages. <https://www.quickanddirtytips.com/education/grammar/google-ngram-and-impact-as-a-verb>.
Mayberry et al., "Subjective frequency ratings for 432 ASL signs." Behav Res (2014) 46, pp. 526-539.
Okrent, "The 11 Best New Words Added to Oxford Dictionaries," Mental Floss, Dec. 4, 2014, 8 pages. https://www.mentalfloss.com/article/60452/11-best-new-words-added-oxford-dictionaries>.
Okrent, "What American Sign Language Looked Like 100 Years Ago," Mental Floss, Mar. 24, 2015, 8 pages. <https://www.mentalfloss.com/article/62418/what-american-sign-language-looked-100-years-ago>.
Rivas et al., "Intelligent System for the Learning of Sign Language Based on Artificial Neural Networks," De Paolis L., Bourdot P. (eds.) Augmented Reality, Virtual Reality, and Computer Graphics: AVR 2019, Lecture Notes in Computer Science (LNCS), vol. 11614, pp. 310-318.
Saggio et al., "Sign Language Recognition Using Wearable Electronics: Implementing k-Nearest Neighbors with Dynamic Time Warping and Convolutional Neural Network Algorithms." Sensors 2020, 20, 3879, Jul. 11, 2020, 14 pages.
Sheffield et al., "Internet slang meets American Sign Language," Hopes&Fears, accessed Sep. 26, 2021, 25 pages. <http://www.hopesandfears.com/hopes/now/internet/168477-internet-american-sign-language>.
Shi et al., "American Sign Language Fingerspelling Recognition in the Wild," 2018 IEEE Spoken Language Technology Workshop (SLT), 2018, pp. 145-152.

\* cited by examiner

AGGREGATING AND IDENTIFYING NEW SIGN LANGUAGE SIGNS

BACKGROUND

The present disclosure relates to visual media file content analysis for sign language gestures, and more specifically, to aggregating & identifying new signs in sign language.

American Sign Language (ASL) has been vital to the community of those that are hearing impaired. For those not familiar, ASL is a natural language that serves as the predominant sign language of Deaf communities in the United States and in most of the Anglophone Canada.

The American Fingerspelled Alphabet consists of 22 handshapes that—when held in certain positions and/or are produced with certain movements—represent the 26 letters of the American alphabet.

SUMMARY

Some embodiments of the present disclosure can be illustrated by a method, system, and computer program product for receiving a corpus of sign language data in which a plurality of known signs each correspond to known meanings, generate a model for identifying new sign language signs using the corpus, and identifying, using the model, a new sign language sign that does not match any of the plurality of known signs.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate analyzing sign language, more particular aspects of the disclosure relate to aggregating & identifying new signs in sign language visual media file content analysis. While the present disclosure is not necessarily limited to such applications, various aspects of the disclosure may be appreciated through a discussion of various examples using this context.

Like most languages, in American Sign Language (ASL) there are often times where new words will be created to describe the ever-changing landscape (e.g., technology changes or cultural evolution). Most times, whenever a new word is introduced, it is finger-spelled and then a new hand-sign (e.g., hand signal) is made to categorize the word, or the hand-sign is shown and then finger-spelled. Fingerspelling can be tedious and time consuming, so a method is needed to aggregate these new interpretations and incorporate the most used versions of new words into an ASL dictionary. The method described herein may be enhanced by various technologies, such as Augmented Reality.

Currently there is no way for computer systems to analyze the large amounts of sign language data available to determine new signs. Sign language poses an interesting dilemma for contextual meanings. Typically, spoken or written language may have certain cues indicating a new concept, phrase or word that is easily digestible by a computer system using natural language processing. However, sign language is unique in that many concepts are assumed by the readers. In fact, often conversational specific gestures are created during the conversation itself. In a simple example, names are often finger spelled. When talking about a specific person that is not present, often the signer may direct a sign for that person to a specific area, and continually refer to that area instead of repeating the person's name. However, out of context, the same sign could also easily mean over there or something over there.

Likewise, due to the nature of sign language it is often very regional and thus it may be difficult or impossible for signers in different locations to adopt a new sign. Sign language works best with in person communication. Audio capabilities are obviously of little use when signing language, and video is limited to two dimensions. Although augmented reality systems may increase the utility of long-distance signing conversations, the digestion and simulation of new signs by a human is ultimately limited by the number of conversations a single person can participate in or sign language speeches a person can watch. Thus, it is easy to understand why new signs (e.g., signs for Emoji, Photobomb, Selfie, and/or Shaking-my-head) may not spread quickly enough to gain useful adoption or may even produce multiple gestures for a single meaning. For example, a new term may have two, three, or more different sign variations accepted by large communities at a single time.

ASL is a living language that is constantly growing with new signs. For example, these new signs can be associated with new words within a respective written/spoken language (e.g., English) such that these signs have substantially the same meaning of these new words within the respective languages. Today, the entire process is somewhat organic. Therefore, a method, system, and computer program product are proposed to rapidly aggregate and identify the consensus signs for new lexical concepts (for people typically finger-spelling the new word) that are being used by members of the ASL signing community.

The proposed method may aid in the definition that drives the organic evolution of a new sign pertaining to ASL and accelerate this entire process of reaching a consensus for the sign. The proposed method may also enrich the ASL (American Sign Language) vernacular by helping to identify new signs for words that previously had no sign or multiple signs.

Likewise, the proposed system may increase the capabilities of translation software by enabling the system to ingest and incorporate new terms. The proposed method may provide a system for distribution of new signs to users based on personalized corpora that relate to respective users.

Some cognitive computing systems operate by processing large amounts of content (e.g., sign language dictionaries, sign language instruction manuals periodical articles, blog posts). The large amount of content that is processed by a cognitive computing system is often referred to as a "corpus." Some cognitive computing systems may process corpora in which each visual media file in the corpus (e.g., each blog post) is selected for the system by a human reviewer. However, some cognitive computing systems, particularly those based on highly capable neural networks, are capable of processing corpora that are quite large. Selecting content for these cognitive computing systems utilizing human reviewers is significantly time consuming.

Thus, some cognitive computing systems have been designed to automatically obtain a corpus prior to processing it. These cognitive computing systems may obtain a corpus by searching through a large supply of visual media files, such as a visual media file repository or the internet, for visual media files that may be relevant to the processing being performed by these systems. This searching may sometimes be referred to as "crawling" (e.g., crawling the Internet for visual media files). Visual media files that may be relevant are then added to the corpus. This process may be referred to as building a corpus. By automatically crawling for content and building a corpus with that crawled content, cognitive computing systems often can obtain a large corpus far faster and by utilizing far fewer resources than would be possible with human review. In some instance, visual media files may include videos, gifs, extended reality (XR), virtual reality, augmented reality recordings, live streams, or other media able to depict sign language gestures. For example, a conversation between two signers may be live streamed into the system or recorded and added to the corpus later.

However, while cognitive computing systems may be capable of crawling through large amounts of visual media files far faster than human reviewers, cognitive computing systems may be less effective than human reviewers to review a potential visual media file to identify new signs.

Human reviewers are typically able to identify new signs in a visual media file with relative ease but they can only parse through a limited amount of data, and only in real time. For example, human reviewers for a particular topic may be able to spot new signs based on a subjective analysis of the content in a candidate visual media file as compared to their own understanding of the context/conversation in the candidate visual media file. However, cognitive systems lack the ability to subjectively analyze the content in a candidate visual media file, and do not contain an inherent understanding of when an unknown sign is specifically applicable to a certain topic or type of content and not simply just an incidental hand gesture (not meant to convey a meaning). For at least this reason, typical cognitive systems are far less able to identify new signs upon a review of that content than are human reviewers.

For that reason, corpora selected by cognitive systems that crawl a large supply of candidate visual media files and select those visual media files based on the content therein are at a higher risk of missing new signs and not being included than are corpora selected by human reviewers. Further, neural networks trained using those corpora may fail to incorporate new signs into the formation of the neural network, potentially creating a network that is not able to completely analyze modern sign conversations.

However, as discussed, some corpora (e.g., the media available on specific ASL projects, or the media to be used for training purposes/actual decision-making purposes) are too large to be digested and/or reviewed by human reviewers in a reasonable period of time or at a reasonable cost. For at least this reason, a cognitive system is better able to identify new signs.

Some embodiments of this disclosure may improve upon automated identification of new signs by incorporating and analyzing relationships between signs and fingerspelling in visual media files. These sign relationships may indicate likely attributes of a sign associated with the visual media file (e.g., the relation of an unknown sign to a finger spelled word or phrase). In some embodiments these likely attributes may then be attributed to the visual media file to categorize the content with more specificity than a cognitive computing system may be able to identify based on the content of the visual media file alone. In some embodiments, this categorization may be useful to identify when a visual media file is likely to contain new signs.

For example, a cognitive computing system may analyze a video with a signing discussion about a new dance to determine whether the video includes a new sign relating to the new dance.

A content-analysis system may analyze a video and decide if the visual media file does or does not contain new signs. Natural-language processing may be performed on the title of the media file, which may lead the content-analysis system to select the video to review. For example, a title such as "ASL discussion on emojis" or "best sign for emojis" may be selected for analysis if the system is attempting to demine the most prevalent sign.

Some embodiments may thus involve analyzing (e.g., through natural language processing and sentiment analysis) finger spelled works in documents to rule out or flag gestures as potential new signs. For example, a finger spelled name of a person does not usually have its own sign, but a new emerging technology or slang word may have its own sign.

In some embodiments, pattern analysis may be used in conjunction with content analysis to identify candidate signs. For example, rather than logically analyze the meaning of such visual media files (e.g., to attribute their meaning to relationships between the associated entities and the categorization of those entities as likely or unlikely to produce new signs), the visual media files and sign structure lists, among other potential inputs, associated with a particular visual media file may be prepared for analysis by a neural network trained to recognize patterns among the visual media files and sign structure lists. In some embodiments, "preparing" for analysis (for example by a neural network) may include vectorizing the visual media files and sign structure lists. In other embodiments it may include performing some natural-language processing on the visual media files with the signs therein and vectorizing the processed data.

In some of these embodiments, the neural network may be trained to recognize patterns among the visual media files (such as an unknown sign before or after a finger spelled word), sign structure lists, and other data (or the processed forms of those inputs) associated with a particular candidate visual media file. The neural network may be trained to then match those recognized patterns to patterns (e.g., two similar gestures before the same finger spelled word) associated with two or more visual media files that the neural network has been trained to categorize as, for example, likely or not likely to contain new signs. If one-or-more visual media files had been categorized as unlikely to contain new signs, the neural network may also categorize the particular candidate visual media file as unlikely to contain new signs. In this way, the neural network may be capable of accurately categorizing a particular candidate visual media file as containing or not containing a particular new sign. With sufficient relationship data, the system may aggregate signs between multiple videos to define a new gesture.

Figure 1:
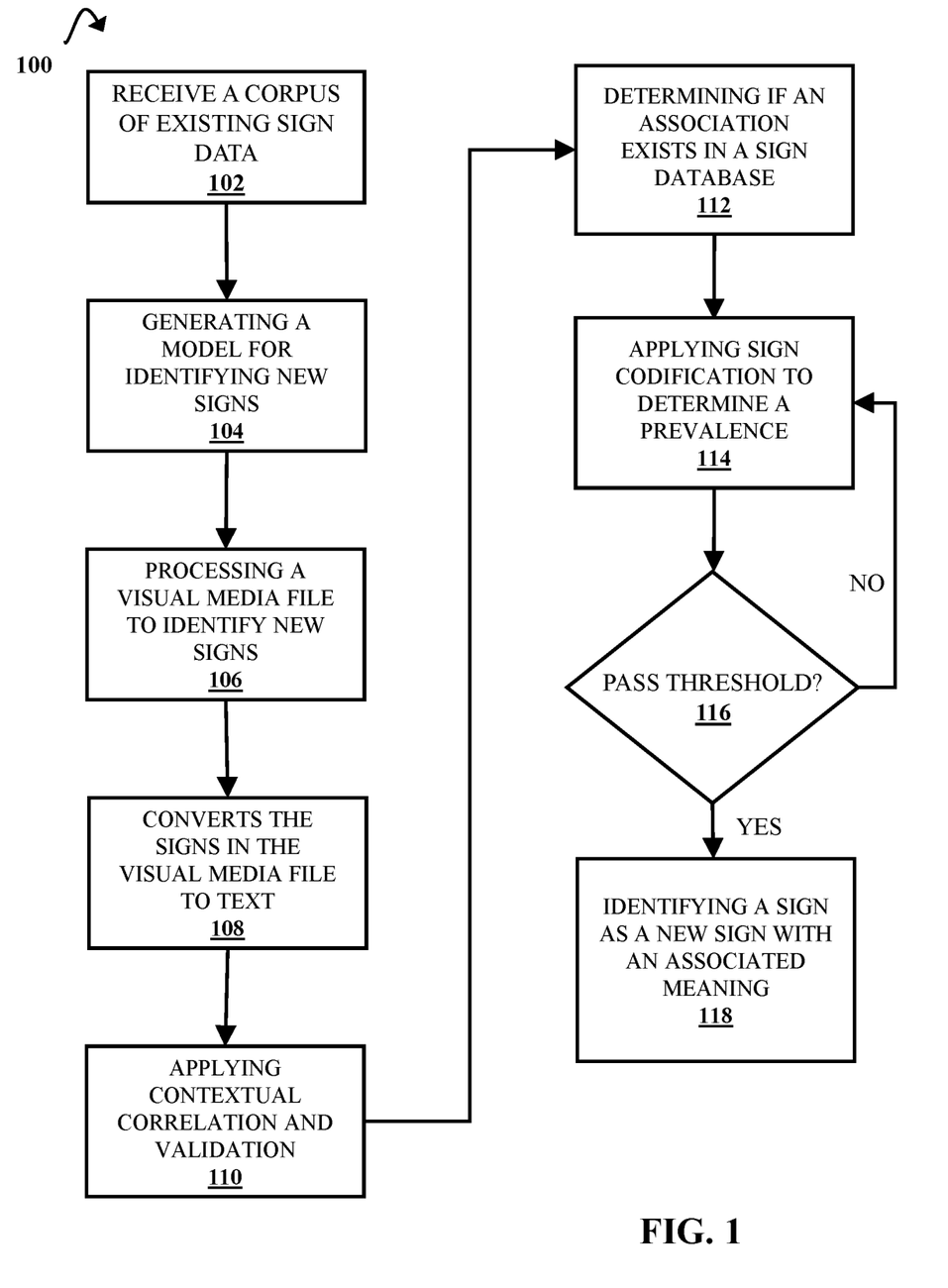
FIG. 1 depicts an example method of aggregating and identifying new signs for sign language, in accordance with embodiments.

FIG. 1 illustrates an example method 100 of aggregating and identifying new signs for sign language. In block 102, a corpus of existing sign data is received, where this corpus includes known signs that correspond to known meanings. In some embodiments, the corpus of existing data may be a sign language dictionary, a database of sign language terms, sign language instructional media, etc. In some embodiments, the corpus of existing data has a model trained for the identification of new signs. For example, the corpus of data may have 100 specially designated videos that have been certified to depict situations were new signs were introduced. These videos may be specifically selected to demonstrate situations where a new sign is introduced and fingerspelled directly before after the introduction of the new sign.

In some embodiments, the corpus of data may also contain one or more sign language databases. For example, established signs may be extracted from sign language dictionaries and/or other databases. In some embodiments, the corpus of data may have information on natural language processing (NLP) for sign language. For example, several NLP methods are available to convert American sign language (ASL) into text. Sign language, including ASL, is not a word for word translation to English. Grammar, context, and vernacular all have unique characteristics that require translation as from any other language.

In block 104, the system analyzes the existing data corpus to generate a model for identifying new signs. In some embodiments, the system may use the existing corpus of data to train a neural network. See FIGS. 2 and 3 below for more details on neural networks. In some embodiments, the corpus may have metadata training tags to more efficiently teach the system about the identification of new signs. For example, metadata tags could indicate variations in introductions of new terms, order of finger spelling/new term signing, etc. In some embodiments, the system may extract specific triggers indicating new signs. For example, the system may have specific word triggers, specific facial expressions, and/or sign inflections that indicate a new sign is likely.

In some embodiments, the system may be trained to recognize specific triggers and evaluate the likelihood of a new sign being detected. In some embodiments, the system may also be trained to determine a meaning for the new sign. For example, a finger spelled "emoji" right before a new sign would mean that the meaning of the new sign is "emoji."

In block 106, the system processes a visual media file to identify new signs. In some embodiments, using the model enabled in block 104, the system may designate one or more signs in one or more visual media files as potential new signs. In some embodiments, the system uses the neural network trained in block 104 to identify potential new signs. The system may use the cues described above (an unknown sign before or after a fingerspelled word, a facial expression, etc.) to identify potentially new signs. In some embodiments, any sign that the system identifies may first be checked to determine if there is already a meaning ascribed to the sign. However, having a meaning ascribed to a sign is not dispositive that it does not have a new meaning as well. Like English words, signs in sign language may have multiple meaning. For example, "you are on fire" traditionally used to mean "your hair is on fire" had developed the meaning "good" as well. Thus, the sentence "that is lit" may mean that the stove is on, or may mean a show is good, depending on the subject of the phrase.

This determination may be based on any combination of the analyses of relationship information discussed herein. For example, in some embodiments, a deep-learning neural network may process a multi-dimensional vector that expresses various sign structure information relating to an adjacent sign associated with the candidate sign of interest, where adjacent means near the candidate sign in sign sentence structure. That neural network may output a value that expresses the confidence that the candidate sign is a sign for the word/phrase (e.g., the word/phrase that was fingerspelled in the visual media file). For example, an output value of 0.0 may represent a 0% confidence of a new sign, whereas an output value of 1.0 may represent a 100% confidence of a new sign. In other embodiments, two values may be output by the neural network: a first value that expresses a confidence that the candidate sign is a sign for the word/phrase, and a second value that expresses a confidence that the candidate sign is not a sign for the word/ phrase. In some such embodiments, these two values may add up to 100% confidence (e.g., 1.0).

In some embodiments, visual media files flagged as potentially containing new signs may not be included in a corpus automatically, but may be categorized by human reviewers as containing or not containing new signs.

In block 108, the system converts the signs in the visual media file to text. In some embodiments, finger-spelling and even other signs may be translated/transliterated into written language using a computer implemented method such as natural language processing (NLP). For example, several programs are available for translating sign language into English.

In block 110, the system applies contextual correlation and validation to the translated text. In some embodiments, if the system accidentally translates the finger-spelled word with a mistake, actions are taken to rectify the mistake. In some instances, the finger spelled word may be spelled incorrectly or a small variation in a hand gesture may cause the system to incorrectly interpret a first sign as a first letter instead of a second letter (where the second letter was the correct interpretation). For example, K and P have a very similar hand gesture. The fingers for both letters are configured in the same manner, however, with K the fingers point up and with P the fingers point forward or slightly down. In some embodiments, a spelling and grammar checker may be applied to the translated text to validate the text. Likewise, in some embodiments, a user may be queried to verify whether or not that was the word was correctly translated.

In some embodiments, contextual correlation systems may be used to determine if the finger spelled word makes sense with the rest of the content in the communication. For example, after translation into text, a Bag of Words (BoW) algorithm or Contextual Co-Occurrence Captioning Model may be used to check the finger spelled word to determine if it is logically consistent with the rest of the content in the communication.

In block 112, the system may determine if an association of the new sign to the fingerspelled word exists in a sign database (for example, the corpus received in block 102). In some embodiments, the determination may be performed by initiating a word search of one or more databases, and then comparing the new gesture to one associated with the word/phrase in the database. For example, an online dictionary may be searched for an entry of "quantum computing." If the search comes back with a designated sign for quantum computing, the system may compare the new sign to the designated sign. If the comparison surpasses a threshold (e.g., a 90% match, 5/6 of the movements for the signs are the same, etc.) the new sign may be associated with the designated sign. If the comparison does not surpass a threshold, the system may add the new sign as a possible substitute for the designated sign (for example, associating the new sign to the word).

If the search does not find a matching entry for the word/phrase, a new entry for the word/phrase with the associated new sign may be created.

In block 114, the system applies sign codification to determine a prevalence score of the new sign. In some embodiments, a cognitive computer system determines a degree to which the new sign is being adopted (called prevalence score herein). In some embodiments, blocks 106-112 may be performed multiple times for the same word or phrase. Multiple "new signs" may be used for the same word or phrase. In some embodiments, the system may receive metadata (e.g., engagement data such as likes, clicks, views, etc.) with the videos the signs were derived from in block 106 and develop a model for suggesting which sign is the most appropriate. Some parameters used by the model (e.g., a neural network model) to calculate a prevalence score may include:

1. A number of instances a specific sign is used across a myriad of visual media files. For example, the method of blocks 102-112 may be repeated multiple times to gather multiple candidate signs for a word/phrase with a number of instances for each of those candidate signs. For example, if sign A had 150 instances and sign B only had 5 instances, the system may determine that sign A is a better candidate gesture for a word. There may be instances where multiple signs are used in roughly the same number of instances, in such a case both signs may be selected as a candidate sign of interest.

2. Popularity of a sign (e.g., likes, up-votes, or down votes, positive comments on a post) for a particular sign or visual media. For example, consider a scenario where sign A and B are both used for a word in separate videos. If the sign A video receives 100,000 likes and the sign B video receives 2 likes, the sign A video may be selected as a candidate in block 116 below. Again, multiple signs may be selected if multiple signs have a similar popularity.

3. Number of interactions for a visual media file containing the sign. For example, the system could weight a number of views of a video containing the sign on social media posts.

4. Other factors such as expert opinions, voting, etc. may be used for the model without departing from the scope of this disclosure.

Based on these factors, the model may include each of the parameters into an equation, where the prevalence score is continuously changed over time. For example, such an equation may be [number of page likes]+[number of social media views]+[number of times the sign is used]=[Score], and the score is updated when new likes, views, or usages are received 1.

In block 116, the system may determine if the prevalence score surpasses a threshold. In some embodiments, candidate signs may need to attain a certain threshold in block 116, based on the prevalence score derived above, in order to be counted as a new consensus sign. For example, in some embodiments a value greater than 50% prevalence of a candidate sign for a word may cause a candidate sign to be identified as a new sign (e.g., such that rules of a model are updated accordingly, and/or the sign is annotated and/or included as such in a corpus), whereas a value lower than 50% certainty of a candidate sign may not cause the candidate sign to be identified as not a new sign (e.g., where the sign may be flagged as having not enough data, or it may be disregarded/excluded from a corpus). In some embodiments, a more complex prevalence threshold (e.g., a yes-maybe-no threshold) may be utilized. Such a threshold may increase accuracy and enable human reviewers to supervise and further train a neural network to identify the likelihood of new signs. For example, a human may review any signs marked with a "maybe" threshold designation (e.g., 40-60%).

In some embodiments, candidate signs that surpass a threshold may be identified as new signs, resulting in various actions as described herein (e.g., rules of a model or cognitive computing system being updated, or these new signs being annotated/tagged in a corpus as a new sign, or the like). In some instances, the threshold determination may be tailored to prevent bad actors from making up new or inappropriate signs. For example, signs would need to be used in a particular number of videos before it would be considered to be a new sign that is associated with a new meaning in block 118 below.

In some embodiments, if the sign does not exceed a threshold, the process may return to block 114 once additional sign data is received. Initially, no sign may pass the threshold, but as a sign gains in popularity, the sign may become the most prevalent sign for the associated word/phrase.

In block 118, the sign is identified as a new sign with an associated meaning. This may result in a model or neural network as described herein to change rules/weights to account for this new sign. This may also result in this new sign that is determined to have the associated meaning to be tagged/annotated as a new sign in a corpus. In some embodiments, the corpus may be a sign language dictionary/database or supplied to dictionary/databases (e.g., such that aspects of this disclosure may improve the comprehensive nature of these sign language dictionaries over time).

In some embodiments, users may opt into a service, where new signs that are most relevant to them are displayed for the user to view. The service may be a live service for users recording videos or live chatting with another user. In some embodiments, the service may include capturing user data of most used words and phrases for a specific user and informing the user whenever a new word similar to what they like is defined. Capturing most used words and phrases for a specific user may be performed using a method similar to that described in block 106.

In some embodiments, the training in block 106 may include preparing the sign structure (e.g., the relation between a new sign and the sign around the new sign) information that has been identified for the entities for further analysis by a neural network. For example, in some embodiments, sign structure information, such as the sign structure information that is expressible, for example, by a sign structure-relation graph or numerically, may be expressed in a multi-dimensional vector. Each dimension of such a vector may contain a numerical value that expresses some information about the relationship between an adjacent sign and other entities. In some embodiments, the information in some dimensions may include relationships between multiple discrete entities. In some embodiments, the information in some dimensions may include whether a relationship is positive or negative, and whether it reflects positively or negatively on the adjacent sign. In other embodiments, only basic association information may be included, such as information related to what entities are associated with other entities. In related embodiments, the strengths of those associations may also be included.

A vector, as used herein in relation to an input of a neural network (e.g., a feature vector), may refer to a matrix consisting of a single column or row of elements. The number of elements in the column or row is referred to herein as the "dimensions" of the vector. Some vectors are referred to as "numerical vectors." Numerical feature vectors may have, in each dimension (e.g., each element in the row or column), a number that expresses the data carried in that dimension. For example, some number vectors may express data in decimals between (and sometimes including) 0.00 and 1.00. Thus, a 5-dimension number vector may be represented as [0.53, 0.29, 0.00, 0.98, 0.02]. In this vector, each of those five numbers may express data about a different property of a sign or group of signs in a visual media file, a meaning associated with the sign, the relationships of signs in the visual media file, or others.

In these embodiments, the analysis in block 108 may involve inputting the multi-dimensional vector into a neural network that has been trained to analyze relationship information between signs to determine a likelihood that a first visual media file contains new signs. For example, the input layer of a deep neural network may take the form of a flat feature layer that is specialized to accept a multi-dimensional vector that expresses sign structure information, process the multi-dimensional vector, and pass the resulting values to subsequent hidden layers as the inputs to those layers. Those hidden layers may process those resulting values, passing the further resulting values to further subsequent hidden layers, until an output layer is reached.

In some embodiments, the analysis of block 108 and categorization of block 110 may increase the accuracy with which a cognitive computer system may identify new signs beyond a categorization system that does not consider the implications of sign structure information.

As discussed, in some embodiments a cognitive computer system may reject or accept a new sign based on a simple threshold. However, in other embodiments, a more complex certainty threshold may be utilized. For example, in some embodiments any value greater than 70% certainty of new signs may cause a new sign to be identified as such by the cognitive computer system (e.g., and therein included in a corpus and annotated as a new sign), whereas any value lower than 20% certainty may cause a new sign to be excluded as a new sign by the cognitive computer system (e.g., and therein excluded from a corpus, and/or included but not annotated as a new sign). In such embodiments, values between 20% certainty and 70% certainty may cause a new sign to be identified as one of a set of potentially included new signs (potential category). In some embodiments, signs that are in the potential category may be reviewed by a human. For example, signs falling between the 20% and 70% certainty may be sent to a human reviewer to determine if the sign is new, and should be identified/tagged as such by the cognitive computer system and/or included in a corpus as such. In some embodiments, signs that are in the potential category may be held until further data is gathered. For example, any sign falling between the 20% and 70% certainty may not be identified and/or tagged as a new sign until further data moves the certainty below the 20% or above 70% certainty.

As has been discussed previously, in some embodiments a deep-learning neural network may be configured to accept all information related to a visual media file of interest and that may be relevant to whether the visual media file of interest contains new signs. Such a neural network may be trained to process all the information at once. For example, a neural network may be specialized to accept the outcome of sign-relation analysis, and information related to topic filtration of a visual media file, natural-language processing of a visual media file, and temporal analysis of a visual media file (e.g., what would be the inputs to these analyses) in the form of a single, multi-dimension feature vector. The neural network may process the multi-dimension feature vector through the feature and hidden layers, and be trained to determine, based on all relevant information in the feature vector, whether a visual media file is likely to contain new signs.

As has also been discussed previously, such a neural network may process and analyze the multi-dimension vector by recognizing patterns in the data expressed by that vector and comparing those patterns to patterns related to visual media files on which the neural network has been trained. For example, a neural network may recognize several patterns in the data expressed by a feature vector for a particular visual media file. The neural network may then associate some of those patterns with the patterns associated with visual media files that the neural network has been trained (e.g., by human-supervised training) to label as not containing new signs. However, the neural network may also associate some of those patterns with the patterns associated with visual media files that the neural network has been trained to label as containing new signs. The neural network may then analyze all these patterns and, based on that analysis, label that particular visual media file as likely or unlikely to contain new signs.

In some embodiments the content of the multi-dimension vector may express data relating to several data types. For example, as previously discussed, this vector may include data related to sign relationships, topic analysis, natural-language processing, and temporal analysis related to a visual media file containing sign language and other visual media files associated with that visual media file. In other embodiments, the multi-dimension vector may express data related to a single data type. For example, the vector may include only data related to sign structures (e.g., relationship between new signs and fingerspelling, the signs associated with those signs, the signs associated with those further signs, and so on).

Figure 2:
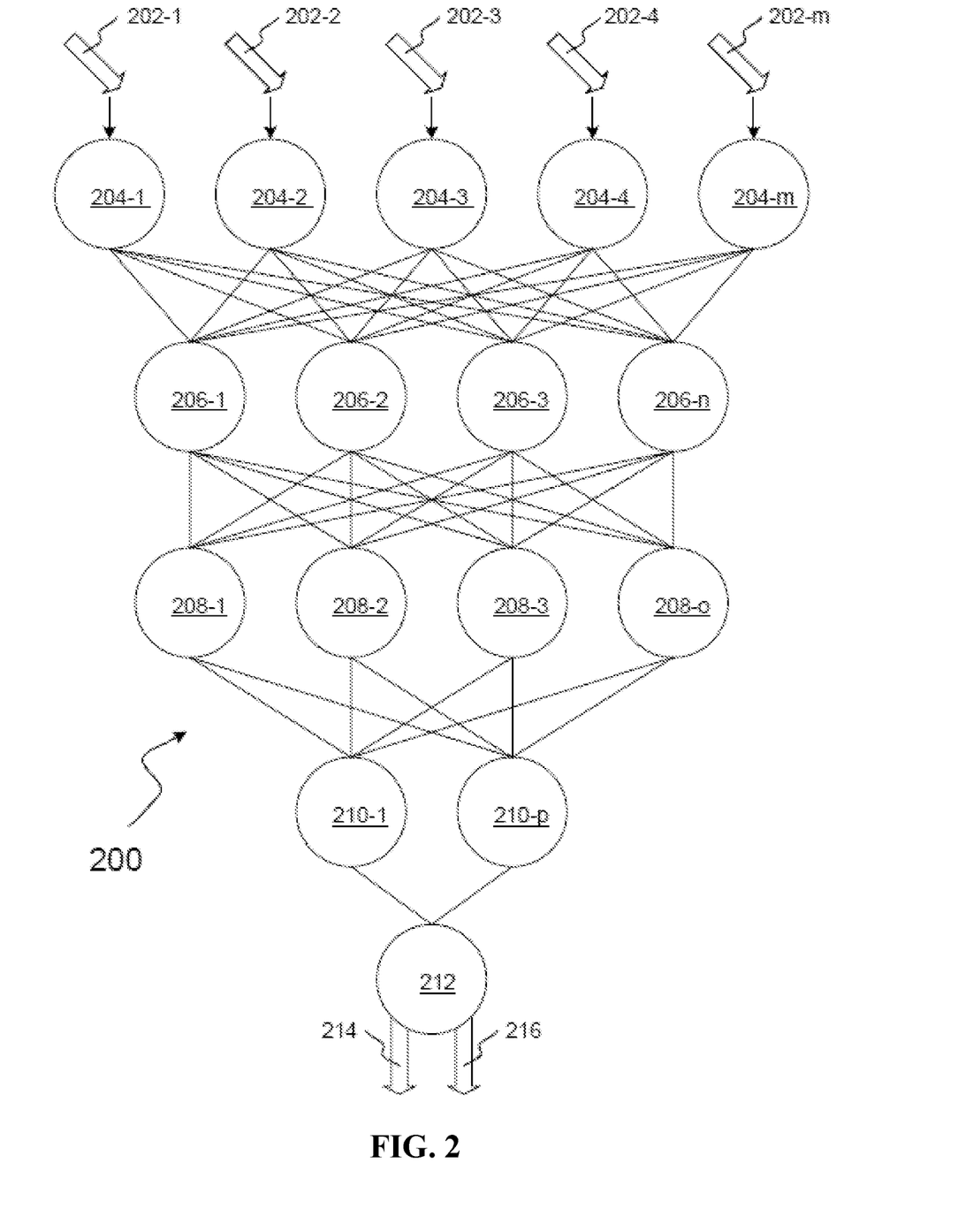
FIG. 2 depicts an example neural network that may be specialized in categorizing the content of a visual media file based on sign structure information, in accordance with embodiments.

Such a neural network is illustrated in FIG. 2. In FIG. 2, neural network 200 may be trained to determine a confidence value that expresses a likelihood that a visual media file contains new signs or that the new sign is the most prevalent sign. The inputs of neural network 200 are represented by feature vectors 202-1 through 202-$m$. These feature vectors may contain all information that is available regarding the visual media file, including sign structure information of at least one sign that is associated with that visual media file. In some embodiments, feature vectors 202-1 through 202-$m$ may be identical copies of each other. In some embodiments, more of instances of feature vectors 202 may be utilized. The number of feature vectors 202-1 through 202-$m$ may correspond to the number of neurons in feature layer 204. In other words, in some embodiments, the number of inputs 202-1 through 202-$m$ (i.e., the number represented by m) may equal (and thus be determined by)

the number of first-layer neurons in the network. In other embodiments, neural network 200 may incorporate 1 or more bias neurons in the first layer, in which case the number of inputs 202-1 through 202-*m* may equal the number of first-layer neurons in the network minus the number of first-layer bias neurons.

Feature layer 204 contains neurons 201-1 through 201-*m*. Neurons 204-1 through 204-*m* accept as inputs feature vectors 202-1 through 202-*m* and process the information therein. Once vectors 202-1 through 202-*m* are processed, neurons 204-1 through 204-*m* provide the resulting values to the neurons in hidden layer 206. These neurons, 206-1 through 206-*n*, further process the information, and pass the resulting values to the neurons in hidden layer 208. Similarly, neurons 208-1 through 208-*o* further process the information and pass it to neurons 210-1 through 210-*p*. Neurons 210-1 thorough 210-*p* process the data and deliver it to the output layer of the neural network, which, as illustrated, contains neuron 212. Neuron 212 may be trained to calculate two values—value 214 and value 216. Value 214 may represent the likelihood that the visual media file being analyzed contains new signs. Value 216, on the other hand, may represent the likelihood that the visual media file does not contain new signs.

In some embodiments, neural network 200 may have more than 5 layers of neurons (as presented) or fewer than 5 layers. These 5 layers may each comprise the same amount of neurons as any other layer, more neurons than any other layer, fewer neurons than any other layer, or more neurons than some layers and fewer neurons than other layers. Finally, in some embodiments, the output of output layer 212 may be used to determine whether to identify a sign as a new sign based on the likelihood of new signs in the visual media file.

Figure 3:
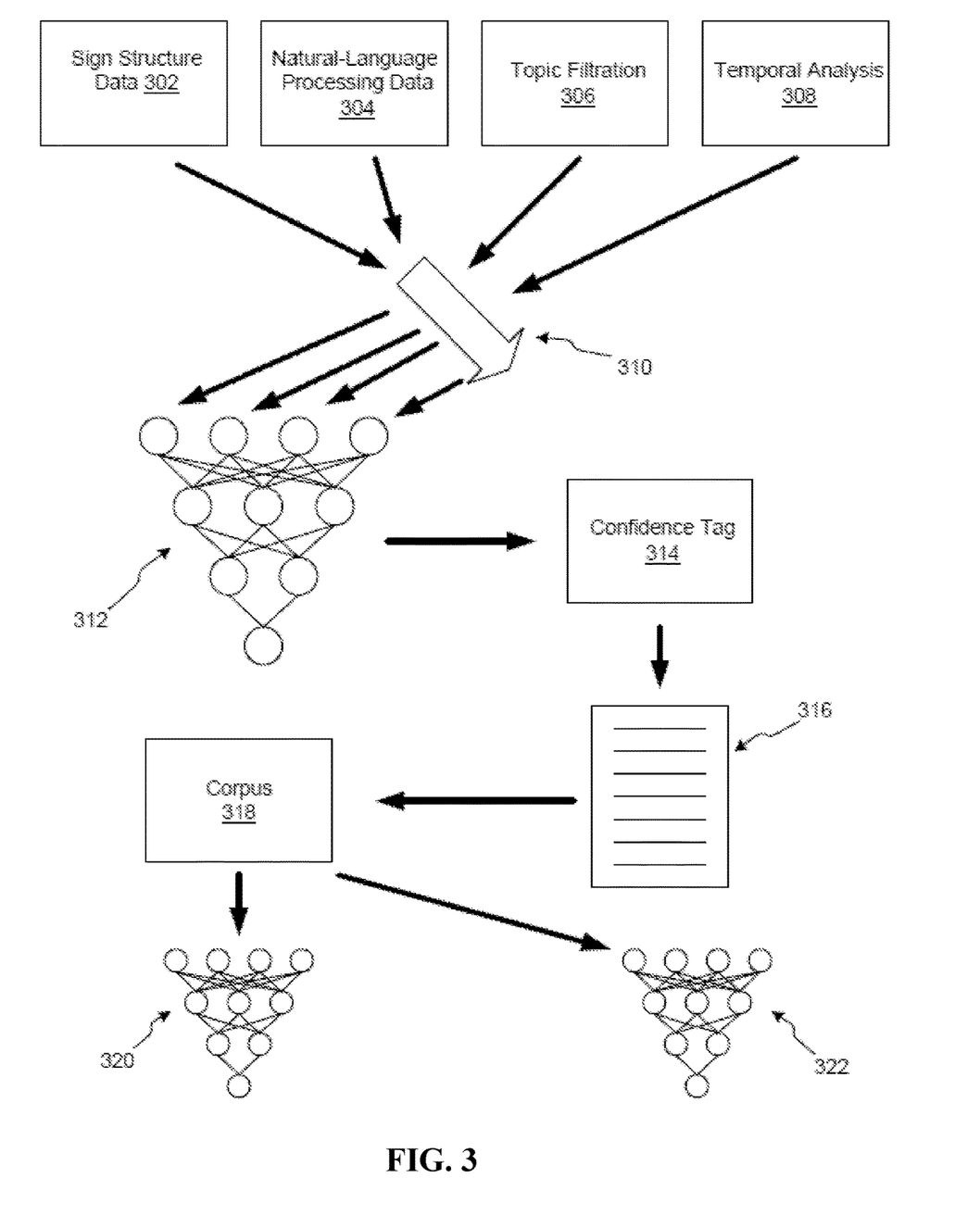
FIG. 3 illustrates an example flow diagram in which a new sign is identified using a visual media file identified as unlikely to contain new signs using sign structure analysis, in accordance with embodiments.

FIG. 3 illustrates an example flow diagram in which a new sign is identified using a visual media file identified as unlikely to contain new signs using sign structure analysis. In the diagram, sign structure data 302, natural-language-processing data 304, topic filtration 306, and temporal analysis 308 represent the available information pertaining to visual media file 316. Inputs 302-308 are converted into feature vector 310, a multi-dimension vector. In some embodiments, feature vector 310 may be a numerical vector.

An instance of feature vector 310 is input the feature layer (also referred to as the input layer) of neural network 312. In some embodiments, an identical instance is input into each neuron in the feature layer of neural network 312. Neural network 312 may be a deep-learning neural network that has been trained to recognize patterns in data associated with visual media file 316 (e.g., patterns in the sign structures associated with the visual media file) and classify visual media file 316 as either likely to contain new signs or not likely to contain new signs based on those patterns.

Neural network 312 classifies a visual media file 316 by outputting a number that corresponds to a confidence tag 314 that visual media file 316 contains new signs. For example, if 0 represents complete confidence that visual media file 316 contains new signs, and 10 represents complete confidence that visual media file 316 contains new signs, a score of 7.5 may represent 25% confidence that visual media file 316 contains new signs. Visual media file 16 is then tagged based on whether the confidence classification is above a confidence threshold. For example, if the threshold were 40% confident that the visual media file contains new signs, a 45% confidence may result in visual media file 316 being tagged as "likely to contain new signs," whereas a 35% confidence may result in visual media file 316 being tagged as "not likely to contain new signs.

Visual media file 316 is determined to be unlikely to contain new signs and is thus added to corpus 318. Corpus 318 may then be used for several purposes. For example, neural networks 320 and 322 could analyze the visual media files of corpus 318 as part of unsupervised network training. For example, neural network 320 may be a question-and-answer neural network, that accepts questions entered by human users, parses them, and attempts to answer them using natural-language generation. Because corpus 318 may be less likely to contain new signs after being processed by neural network 312, network 320 may be less likely to compose answers with offensive content than when using a corpus that has not been processed similarly.

Figure 4:
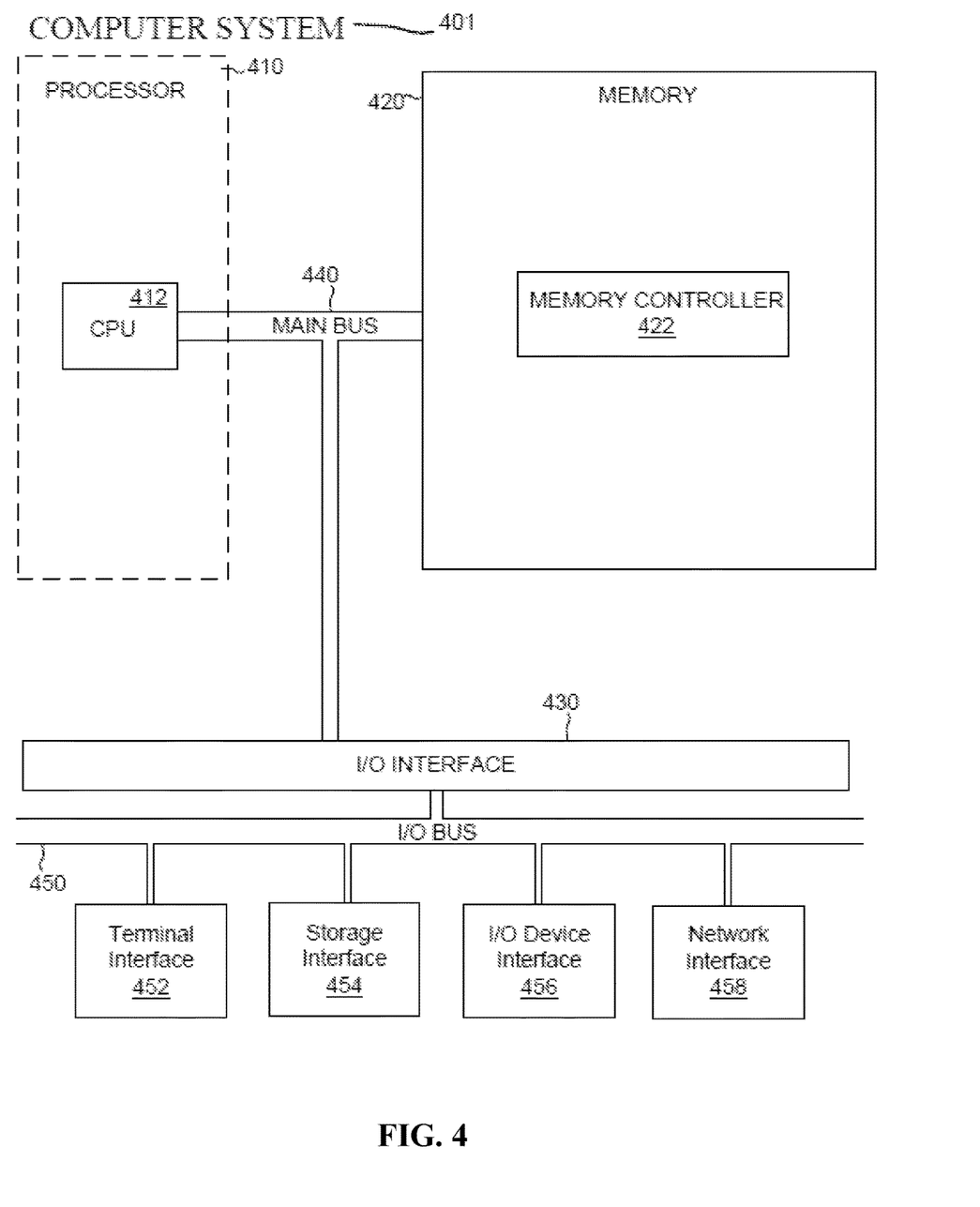
FIG. 4 depicts the representative major components of a computer system that may be used in accordance with embodiments.

FIG. 4 depicts the representative major components of an exemplary Computer System 401 that may be used in accordance with embodiments of the present disclosure. The particular components depicted are presented for the purpose of example only and are not necessarily the only such variations. The Computer System 401 may comprise a Processor 410, Memory 420, an Input/Output Interface (also referred to herein as I/O or I/O Interface) 430, and a Main Bus 440. The Main Bus 440 may provide communication pathways for the other components of the Computer System 401. In some embodiments, the Main Bus 440 may connect to other components such as a specialized digital signal processor (not depicted).

The Processor 410 of the Computer System 401 may be comprised of one or more CPUs 412. The Processor 410 may additionally be comprised of one or more memory buffers or caches (not depicted) that provide temporary storage of instructions and data for the CPU 412. The CPU 412 may perform instructions on input provided from the caches or from the Memory 420 and output the result to caches or the Memory 420. The CPU 412 may be comprised of one or more circuits configured to perform one or methods consistent with embodiments of the present disclosure. In some embodiments, the Computer System 401 may contain multiple Processors 410 typical of a relatively large system. In other embodiments, however, the Computer System 401 may be a single processor with a singular CPU 412.

The Memory 420 of the Computer System 401 may be comprised of a Memory Controller 422 and one or more memory modules for temporarily or permanently storing data (not depicted). In some embodiments, the Memory 420 may comprise a random-access semiconductor memory, storage device, or storage medium (either volatile or non-volatile) for storing data and programs. The Memory Controller 422 may communicate with the Processor 410, facilitating storage and retrieval of information in the memory modules. The Memory Controller 422 may communicate with the I/O Interface 430, facilitating storage and retrieval of input or output in the memory modules. In some embodiments, the memory modules may be dual in-line memory modules.

The I/O Interface 430 may comprise an I/O Bus 450, a Terminal Interface 452, a Storage Interface 454, an I/O Device Interface 456, and a Network Interface 458. The I/O Interface 430 may connect the Main Bus 440 to the I/O Bus 450. The I/O Interface 430 may direct instructions and data from the Processor 410 and Memory 420 to the various interfaces of the I/O Bus 450. The I/O Interface 430 may also direct instructions and data from the various interfaces of the I/O Bus 450 to the Processor 410 and Memory 420. The various interfaces may comprise the Terminal Interface 452, the Storage Interface 454, the I/O Device Interface 456, and the Network Interface 458. In some embodiments, the various interfaces may comprise a subset of the aforementioned interfaces (e.g., an embedded computer system in an industrial application may not include the Terminal Interface 452 and the Storage Interface 454).

Logic modules throughout the Computer System 401—including but not limited to the Memory 420, the Processor 410, and the I/O Interface 430—may communicate failures and changes to one or more components to a hypervisor or operating system (not depicted). The hypervisor or the operating system may allocate the various resources available in the Computer System 401 and track the location of data in Memory 420 and of processes assigned to various CPUs 412. In embodiments that combine or rearrange elements, aspects of the logic modules' capabilities may be combined or redistributed. These variations would be apparent to one skilled in the art.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A system comprising:
a processor; and
a memory in communication with the processor, the memory containing program instructions that, when executed by the processor, are configured to cause the processor to perform a method, the method comprising:
receiving a corpus of sign language data in which a plurality of known signs each correspond to known meanings;
generating a model for identifying new sign language signs using the corpus;
receiving a visual media file;
processing the visual media file with the model;
identifying, using the model, a new sign language sign in the visual media file that does not match any of the plurality of known signs;
converting signs in the visual media file to text;
applying contextual correlation and validation to the text; and
extracting a meaning, from the text, associated to the new sign.

2. The system of claim 1, wherein the memory contains additional program instructions that, when executed by the processor, are configured to cause the processor to perform the method further comprising:
converting finger spellings in the visual media file to additional text.

3. The system of claim 1, wherein the memory contains additional program instructions that, when executed by the processor, are configured to cause the processor to perform the method further comprising:
applying sign codification to determine a prevalence of an association.

4. The system of claim 3, wherein the memory contains additional program instructions that, when executed by the processor, are configured to cause the processor to perform the method further comprising:
determining that the prevalence of the association surpasses a threshold, and
including the association in a corpus.

5. The system of claim 3, wherein the applying sign codification is based upon a number of instances the association is used.

6. The system of claim 1, wherein the memory contains additional program instructions that, when executed by the processor, are configured to cause the processor to perform the method further comprising:
determining if the association of the meaning and the new sign exists in the corpus, and
creating, based upon a finding that the association does not exist, a new entry for the association.

7. A computer program product, the computer program product comprising a computer readable storage medium having program instructions embodied therewith, the program instructions executable by a computer to cause the computer to perform a method comprising:
receiving a corpus of sign language data in which a plurality of known signs each correspond to known meanings;
generating a model for identifying new sign language signs using the corpus;
receiving a visual media file;
processing the visual media file with the model;
identifying, using the model, a new sign language sign in the visual media file that does not match any of the plurality of known signs;
converting signs in the visual media file to text;
applying contextual correlation and validation to the text; and
extracting a meaning, from the text, associated to the new sign.

8. The computer program product of claim 7, wherein the computer readable storage medium comprises additional program instructions executable by the computer to cause the computer to perform the method further comprising:
converting finger spellings in the visual media file to additional text.

9. The computer program product of claim 8, wherein the computer readable storage medium comprises additional program instructions executable by the computer to cause the computer to perform the method further comprising:
applying sign codification to determine a prevalence of an association.

10. The computer program product of claim 9, wherein the computer readable storage medium comprises additional program instructions executable by the computer to cause the computer to perform the method further comprising:
determining that the prevalence of the association surpasses a threshold, and
including the association in a corpus.

11. The computer program product of claim 9, wherein the applying sign codification is based upon a number of instances the association is used.

12. The computer program product of claim 8, wherein the computer readable storage medium comprises additional program instructions executable by the computer to cause the computer to perform the method further comprising:
determining if the association of the meaning and the new sign exists in the corpus, and
creating, based upon a finding that the association does not exist, a new entry for the association.

13. A method comprising:
receiving a corpus of sign language data in which a plurality of known signs each correspond to known meanings;
generating a model for identifying new sign language signs using the corpus;

receiving a visual media file;

processing the visual media file with the model;

identifying, using the model, a new sign language sign in the visual media file that does not match any of the plurality of known signs;

converting signs in the visual media file to text;

applying contextual correlation and validation to the text; and extracting a meaning, from the text, associated to the new sign.

14. The method of claim 13 further comprising:

converting finger spellings in the visual media file to additional text.

15. The method of claim 14 further comprising:

applying sign codification to determine a prevalence of an association.

16. The method of claim 15 further comprising:

determining that the prevalence of the association surpasses a threshold, and including the association in a corpus.

17. The method of claim 15, wherein the applying sign codification is based upon a number of instances the association is used.

\* \* \* \* \*